Patented Dec. 2, 1947

2,432,065

UNITED STATES PATENT OFFICE 2,432,065

PURIFICATION OF ISOQUINOLINE

Francis E. Cislak and Merritt M. Otto, Indianapolis, Ind., assignors to Reilly Tar & Chemical Corporation, Indianapolis, Ind., a corporation of Indiana No Drawing. Application October 20, 1943, Serial No. 507,019

6 Claims. (Cl. 260—283)

Our invention relates to the purification of isoquinoline.

It is the object of our present invention to obtain a purified isoquinoline; and to obtain new compounds of isoquinoline with a tar acid of the class consisting of phenol and betanaphthol.

Isoquinoline, associated with various other basic nitrogen bodies, is obtained in the processing of coal tar. Most of the other basic nitrogen bodies commonly present can be separated quite readily and fairly completely from the isoquinoline by fractional distillation. But the boiling points of quinoline and quinaldine are so close to that of isoquinoline that it is not commercially practical to separate the isoquinoline from them by fractional distillation.

We have found that by treating crude isoquinoline, containing quinoline and/or quinaldine, whether or not the crude isoquinoline also contains small amounts of higher and/or lower related basic nitrogen bodies, with a tar acid of the class consisting of phenol and betanaphthol, and cooling, we get a formation of crystals of the compound of the tar acid with isoquinoline, an addition product of some character composed of one molecule of isoquinoline with one molecule of tar acid. The cooling is desirably to a temperature of about 10° C.–25° C. The crystals can readily be recovered, as by decanting or filtering; and can readily be reconverted into substantially pure isoquinoline and substantially pure tar acid, as by fractional distillation or by treatment with dilute aqueous caustic soda solution.

The phenol-isoquinoline and the betanaphthol-isoquinoline, recovered as aforesaid, are new compounds. The phenol-isoquinoline has a melting point of about 42° C.; the betanaphthol-isoquinoline has a melting point of about 54° C. They are of interest in the preparation of disinfectants and insecticides, as well as in the present process of purifying isoquinoline.

The following examples illustrate our invention:

*Example 1.*—One hundred thirty lbs. of crude isoquinoline is thoroughly mixed with about 80–90 lbs. of phenol. With these proportions there is a molecular excess of crude isoquinoline; which we deem desirable, although it is not essential. When the mixing is completed the mixture is cooled to about 10° C. to 25° C. By such cooling, an addition product, phenol-isoquinoline, usually crystallizes spontaneously from the mixture; although sometimes it is necessary to start crystallization by seeding with crystals of phenol-isoquinoline. The crystals of phenol-isoquinoline produced by the cooling are suitably separated, most conveniently by filtration or centrifugation. These crystals are subjected to fractional distillation, which decomposes them into phenol and isoquinoline; whereupon the phenol distills over first, and then at a much higher temperature the isoquinoline distills over. As so recovered, the isoquinoline is usually of about 90% purity. The isoquinoline thus obtained is sufficiently pure for many uses.

If greater purity of the isoquinoline is desired, however, it is readily obtained by purification of the phenol-isoquinoline from which it was obtained. Conveniently such purification consists in recrystallizing the phenol-isoquinoline from toluene or petroleum naphtha, and separating the purified crystals of phenol-isoquinoline from the mother liquor. On subjecting these purified crystals to fractional distillation, in the same manner as described before, an isoquinoline of 95–98% purity is obtained.

The obtaining of the isoquinoline by fractional distillation from the phenol-isoquinoline compound as above described is our preferred way of obtaining it; but we can obtain it from the phenol-isoquinoline in other ways. For example, we can treat the phenol-isoquinoline with an aqueous caustic soda solution, of between 10% and 50% concentration. This decomposes the phenol-isoquinoline; to yield an upper layer of isoquinoline, and a lower layer of phenol dissolved in aqueous caustic soda. The isoquinoline is separated from the caustic soda solution of phenol by decantation.

*Example 2.*—The procedure of Example 1 is repeated save that in place of the phenol used in Example 1 we use 130–140 lbs. of betanaphthol. The crystals of betanaphthol-isoquinoline, when subjected to fractional distillation, decompose into betanaphthol and isoquinoline, the isoquinoline distilling over first, and then at a much higher temperature the betanaphthol distills over.

We claim as our invention:

1. The process of purifying isoquinoline, which consists in mixing the crude isoquinoline with a tar acid of the class consisting of phenol and betanaphthol, producing in the resulting mixture a sufficiently low temperature to form crystals of the compound of tar acid with isoquinoline, separating such crystals, and chemically decomposing said crystals to liberate isoquinoline in purified form.

2. The process of purifying isoquinoline as set forth in claim 1, in which the tar acid is phenol.

3. The process of purifying isoquinoline as set forth in claim 1, in which the tar acid is betanaphthol.

4. The process of obtaining a compound of isoquinoline with a tar acid of the class consisting of phenol and betanaphthol, which consists in mixing the tar acid with isoquinoline, and producing in the resulting mixture a sufficiently low temperature to form crystals of the compound of the tar acid with isoquinoline, and recovering said crystals.

5. The process of obtaining phenol-isoquinoline, which consists in mixing phenol and isoquinoline, and producing in the resulting mixture a sufficiently low temperature to form crystals of phenol-isoquinoline, and recovering said crystals.

6. The process of obtaining betanaphthol-isoquinoline, which consists in mixing betanaphthol and isoquinoline, and producing in the resulting mixture a sufficiently low temperature to form crystals of betanaphthol-isoquinoline, and recovering said crystals.

FRANCIS E. CISLAK.
MERRITT M. OTTO.

REFERENCES CITED

The following references are of record in the file of this patent:

UNITED STATES PATENTS

| Number | Name | Date |
| --- | --- | --- |
| 1,795,382 | Ulrich | Mar. 10, 1931 |
| 1,980,901 | Bentley | Nov. 13, 1934 |
| 2,193,336 | Lecher et al. | Mar. 12, 1940 |
| 2,272,498 | Zerwick et al. | Feb. 10, 1942 |
| 2,310,616 | Cislak et al. | Feb. 9, 1943 |

OTHER REFERENCES

Chemical Abstracts, 1916, page 1955; ibid., 1943, page 3757.

Journal of Chem. Physics, vol. 5, pages 967–973 (1937).

Biochemische Zeitschrift, vol. 286, page 232.

Arch. für exper. Path. und Pharm., vol. 174, page 255; ibid., vol. 175, page 372.